(12) United States Patent
Kindt

(10) Patent No.: US 6,635,857 B1
(45) Date of Patent: Oct. 21, 2003

(54) METHOD AND APPARATUS FOR A PIXEL CELL ARCHITECTURE HAVING HIGH SENSITIVITY, LOW LAG AND ELECTRONIC SHUTTER

(75) Inventor: Willem Johannes Kindt, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 100 days.

(21) Appl. No.: 09/672,668

(22) Filed: Sep. 28, 2000

Related U.S. Application Data

(60) Provisional application No. 60/217,013, filed on Jul. 10, 2000.

(51) Int. Cl.[7] .............................................. H01L 27/00
(52) U.S. Cl. ................... 250/208.1; 348/296; 348/301
(58) Field of Search ..................... 250/208.1; 348/294, 348/296, 301, 302, 303, 300, 314, 313

(56) References Cited

U.S. PATENT DOCUMENTS

| 5,856,686 | A | * | 1/1999 | Watanabe et al. | 257/291 |
| 5,933,188 | A | * | 8/1999 | Shinohara et al. | 348/302 |
| 6,054,704 | A | * | 4/2000 | Pritchard et al. | 250/208.1 |
| 6,088,058 | A | * | 7/2000 | Mead et al. | 348/296 |
| 6,111,245 | A | * | 8/2000 | Wu et al. | 250/208.1 |
| 6,218,656 | B1 | * | 4/2001 | Guidash | 250/208.1 |

OTHER PUBLICATIONS

Aw et al., "A 128 X 128–Pixel Standard–CMOS Image Sensor with Electronic Shutter," *IEEE J. Solid–State Circuits 31:12*, Dec. 1996, pp. 1922–1930.

Fossum, "CMOS Image Sensors: Electronic Camera–On–A–Chip,", *IEEE Trans. On Electron Devices, 44:10*, Oct. 1997, pp. 1689–1698.

Decker et al., "A 256 X 256 CMOS Imaging Array with Wide Dynamic Range Pixels and Column–Parallel Digital Output," *IEEE J. of Solid–State Circuits, 33:12*, Dec. 1998, pp. 2081–2091.

\* cited by examiner

*Primary Examiner*—Stephone B. Allen
*Assistant Examiner*—Christopher W. Glass
(74) *Attorney, Agent, or Firm*—Merchant & Gould PC

(57) ABSTRACT

An image sensing pixel cell includes a reset circuit, a capacitance, a photodiode, an amplifier circuit, and a voltage buffer. The reset circuit couples an initial voltage to a first node at an initial time, where the capacitance stores the initial voltage. The amplifier circuit is arranged to bias the photodiode at a relatively constant voltage. The voltage buffer circuit buffers the first node to produce a second voltage that corresponds to the voltage at the first node at a subsequent time. The second voltage is different from the initial voltage when a photocurrent flows in the photodiode. A pixel cell may include a shutter circuit having a closed position and an open position. The shutter circuit provides a conductive path for the photocurrent between the photodiode and a power supply connection when in the closed position. The shutter circuit provides another conductive path for the photocurrent between the photodiode and the first node when in the open position. In operation, every pixel cell in the array is reset at substantially the same time. The shutter opens for the entire pixel array to allow photocurrents to integrate on the capacitors in each pixel cell. The shutter closes and image data is read from the array of pixel cells. The image data for an image corresponds to the integrated photocurrents stored on the capacitors in the array of pixel cells.

27 Claims, 5 Drawing Sheets

US 6,635,857 B1

METHOD AND APPARATUS FOR A PIXEL CELL ARCHITECTURE HAVING HIGH SENSITIVITY, LOW LAG AND ELECTRONIC SHUTTER

CROSS-REFERENCE TO RELATED APPLICATIONS

This application claims the benefit of U.S. Provisional Application No. 60/217,013, filed on Jul. 10, 2000 under Title 35, United States Code §119(e).

TECHNICAL FIELD

The present invention relates to an image sensing pixel cell architecture, and particularly to a pixel cell architecture that employs complementary metal oxide semiconductor (CMOS) devices. More particularly still, the present invention relates to an image sensing pixel cell architecture that can provide high sensitivity, relatively lag-free response and an electronic shutter.

BACKGROUND OF THE INVENTION

Recently, CMOS image sensors characterized by their low power consumption have been in great demand as an image capturing device for portable devices, such as digital cameras. It is desirable to have these portable devices capture images of fast moving objects. In order to get these images, typical image sensors open the shutter for only a short period of time. However, when the shutter is open for only a short period of time, only a small amount of light is captured. This small amount of light makes it difficult for the image sensor to output a signal that varies with the amount of light captured (i.e., small differences in the amount of light may result in the same output signal). Typically, CMOS image sensors accommodate for this short shutter open period by providing a pixel architecture having a high sensitivity. Unfortunately, the high sensitivity is provided at a cost of lag that results in a blurred image. Therefore, there is a need for a CMOS image sensor having a pixel cell architecture that provides increased sensitivity while providing relatively lag free operation.

SUMMARY OF THE INVENTION

In accordance with the present invention, a pixel cell architecture provides for a high sensitivity and relatively lag-free response. The pixel cell architecture is configured to maintain a relatively constant voltage across a photodiode so that a photocurrent is not integrated on the photodiode depletion layer capacitance, but rather on another capacitance, which allows a larger output voltage. The capacitance is substantially associated with a first node. In one embodiment, a capacitor is coupled to the first node. In another embodiment, the capacitance is a parasitic capacitance associated with the first node. In one aspect of the invention, an image sensing pixel cell includes a reset circuit, a capacitance, a photodiode, a unity gain current buffer, and a voltage buffer. The reset circuit couples an initial voltage to a first node at an initial time where the capacitance stores the initial voltage. The unity gain current buffer is arranged to bias the photodiode at a relatively constant voltage. The voltage buffer circuit buffers the first node to produce a second voltage that corresponds to the voltage at the first node at a subsequent time. The second voltage is different from the initial voltage when a photocurrent flows in the photodiode. The unity gain current buffer includes a transfer gate transistor and an amplifier circuit. The amplifier circuit is employed to adjust a gate voltage on the transfer gate transistor in a manner to maintain the relatively constant voltage on the photodiode. The gate voltage being adjusted based on the photocurrent flowing in the photodiode. In a further aspect of the invention, the imaging sensing pixel cell includes a select circuit that selectively couples the second voltage to a column output of the pixel cell when selected. In one embodiment, the select circuit is a MOS transistor.

In another embodiment of the invention, the amplifier circuit includes an operational amplifier having an inverting input, a non-inverting input and an output. The inverting input is coupled to the photodiode and the non-inverting input is coupled to a reference voltage. The output is arranged to bias the photodiode at the reference voltage. In a further aspect of this embodiment, the transfer gate transistor includes a MOS transistor having a gate which is coupled to the output of the operational amplifier. The MOS transistor conducts a current corresponding to the photocurrent. In another embodiment, the amplifier circuit includes a common source amplifier.

In another embodiment of the invention, the voltage buffer circuit is a source follower circuit. In a further aspect of this embodiment, the capacitance associated with the first node is dominated by a capacitance of the source follower.

In yet another embodiment of the invention, the pixel cell further includes a shutter circuit having a closed position and an open position. The shutter circuit is configured to provide a first conductive path for the photocurrent between the photodiode and a power supply connection when in the closed position. The shutter circuit is also configured to provide a second conductive path for the photocurrent between the photodiode and the first node when in the open position. In a Further aspect of this embodiment, the shutter circuit includes a first and a second MOS transistor sharing a common drain connection that is coupled to the photodiode. The first transistor is arranged to provide the first conductive path and the second transistor is arranged to provide the second conductive path. In another aspect of this embodiment, the shutter circuit includes a first and a second MOS transistor sharing a common source connection that is coupled to the photodiode. The first transistor is arranged to provide the first conductive path and the second transistor is arranged to provide the second conductive path.

In still another embodiment, the pixel cell further includes a shutter circuit having a first and a second MOS transistor sharing a common source connection that is coupled to the photodiode. The first transistor is arranged to selectively couple the photocurrent to the power supply connection and the second transistor is arranged to selectively couple the photocurrent to the first node. The first and second MOS transistors each have a shutter control coupled to their respective gates. The shutter control is arranged to prevent charge from being injected into the first node. In a further aspect of this embodiment, each shutter control includes a first and a second switching transistor. The first switching transistor couples the output of the amplifier circuit to the respective gate and the second switching transistor couples the respective gate to a circuit ground. The first and second switching transistors are active at different times.

In another aspect of the invention, an image sensing pixel cell circuit includes a reset means, a storage means, an image sensing means, a bias means, and a buffer means. At an initial time, the reset means couples an initial voltage to a storage node where the storage means stores the initial voltage. The bias means maintains a bias voltage across the image sensing means. The bias means includes a transfer gate transistor and an amplifier means. The amplifier adjusts a gate voltage on the transfer gate transistor based on the current flowing in the sensing means in a manner to maintain the relatively constant voltage on the photodiode. The image sensing means produces a current in response to sensing a portion of an image associated with the pixel cell such that when the current flows in the sensing means, a subsequent voltage at the storage node is produced. The subsequent voltage is different from the initial voltage. The buffer means buffers the storage node to produce an output voltage at an output node such that the output voltage corresponds to the portion of the image sensed by the image sensing means.

In one embodiment, the reset means includes a PMOS transistor and the initial voltage is a power supply voltage. In another embodiment, the buffer means is a source follower circuit and the storage means includes a capacitance associated with the source follower circuit. In yet another embodiment, the amplifier means includes an operational amplifier. The operational amplifier has an inverting input coupled to the image sensing means, a non-inverting input coupled to a reference voltage, and an output arranged to bias the image sensing means at the reference voltage.

In a further embodiment, the image sensing pixel cell circuit further includes a shutter means having an open position and a closed position. The shutter means providing a conductive path for the photocurrent between the image sensing means and a power supply connection when in a closed position, and the shutter means providing another conductive path for the photocurrent between the image sensing means and the storage node when in the open position.

In yet a further embodiment, the image sensing pixel cell circuit includes a means for preventing charge injection. The means for preventing charge injection prevents charge from being injected into the storage node from the shutter means.

In yet another aspect of the invention, a method for sensing an image using an array of pixel cells each having a shutter that opens and closes is provided. The photodiode is biased at a relatively constant voltage. Each pixel cell in the array is reset at substantially the same time. The shutter opens so that a photocurrent can integrate on a capacitor in each pixel cell of the entire pixel array. The shutter then closes and image data is read from each pixel cell. The image data corresponds to the integrated photocurrent stored on the capacitor of each of the array of pixel cells. In one embodiment, reading image data from each pixel includes determining a voltage stored on the capacitor of each array of pixel cells. In another embodiment, the image data may be a voltage, a current, or a digital representation. In accordance with this aspect of the invention, the image data that is read further includes reading a first data at a first time and reading a second data at a second time. The difference between the first and second data corresponds to the image data. The first and second data may be a voltage, a current, or a digital representation. In a further aspect, integrating the photocurrent on the capacitor includes maintaining a voltage across the photodiode, producing a photocurrent through the photodiode when a portion of the image is sensed and changing the voltage on the capacitor in response to the photocurrent.

In one embodiment, the resetting of the array of pixel cells includes initializing the capacitor to an initial voltage. In another embodiment, opening the shutter for the entire array of pixel cells enables each capacitor of each pixel cell to integrate its respective photocurrent, while closing the shutter disables each capacitor of each pixel cell from integrating its respective photocurrent.

DETAILED DESCRIPTION OF THE PREFERRED EMBODIMENT

Figure 1:
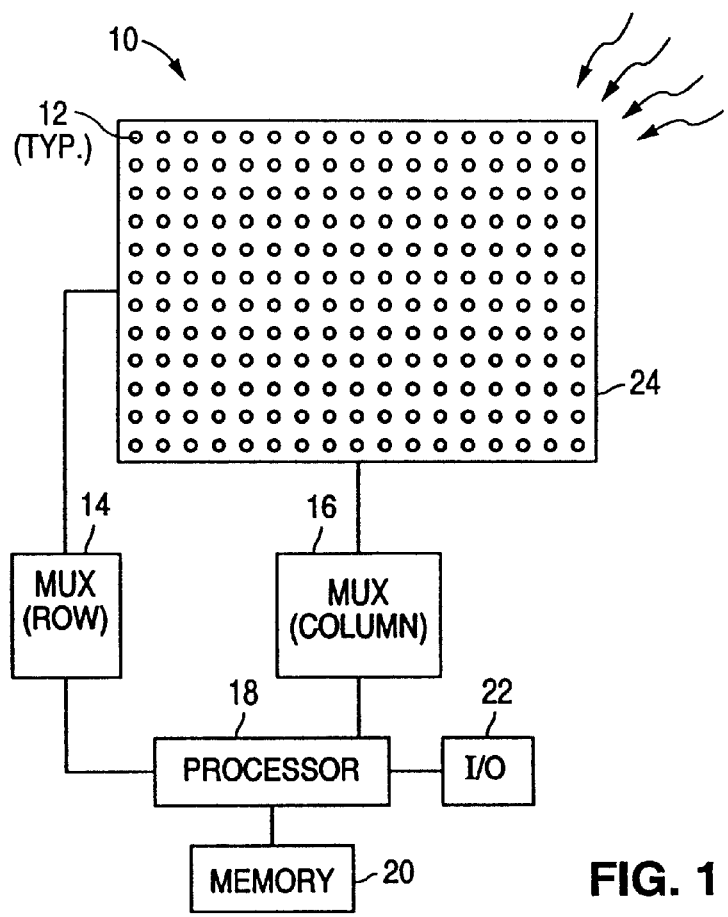
FIG. 1 is a block diagram of an exemplary embodiment of the components for an image sensor.

FIG. 1 shows an exemplary embodiment of a CMOS image sensor 10, which includes an array 24 of individual pixel cells 12 arranged in columns and rows. A processor 18 is coupled to an input/output interface 22, a memory 20 and a multiplexer 14, which is employed to reset and select each row of the pixel cell array 24. The processor 18 is also coupled to another multiplexer 16 that is employed to read the value at each column for a selected row of pixel cells 12.

Figure 2:
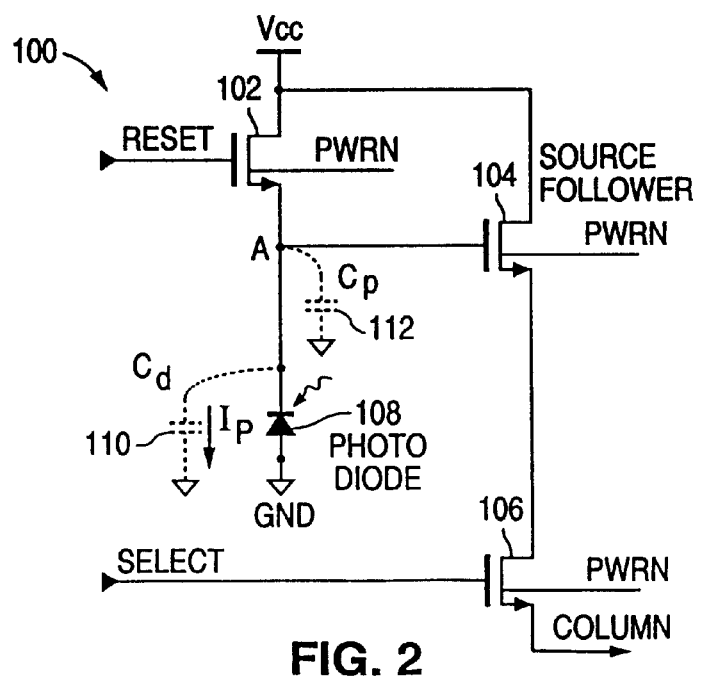
FIG. 2 is a schematic diagram of an exemplary embodiment for a pixel cell architecture having three transistors.

FIG. 2 illustrates a schematic overview 100 of one embodiment of a pixel cell architecture for one of the individual pixel cells 12 shown in FIG. 1. The pixel cell architecture includes three transistors and will be hereinafter referred to as a 3-T pixel cell. The 3-T pixel cell includes a photodiode 108, an NMOS transistor 102, an NMOS transistor 104 and an NMOS transistor 106. The transistor 102 is employed to reset the pixel cell, transistor 104 operates as a source follower voltage buffer and transistor 106 is employed to select the pixel cell. The drains of transistor 102 and transistor 104 are coupled to the positive rail of the power supply (Vcc). The drain of the transistor 106 is coupled to the source of transistor 104. The drain of transistor 102 is coupled to the gate of transistor 104 and the cathode of the photodiode 108 at Node A. A parasitic capacitance (Cp) at the gate of the transistor 104 and a depletion layer capacitance (Cd) of the photodiode 108 appear at node A. The gate of transistor 102 is coupled to a reset line and the gate of transistor 106 is coupled to the select line. The bodies of the transistors 102, 104 and 106 are coupled to the substrate at PWRN. Also, the anode of the photodiode 108 is coupled to the substrate.

The general operation of the 3-T pixel cell is as follows. A positive pulse is applied to the gate of the reset transistor 102 so that a positive bias voltage is applied at the cathode of the photodiode 108 and the depletion layer capacitance (Cd) of the photodiode will charge up. After the reset transistor 102 turns off, the photodiode 108 remains biased at the positive bias voltage because of the charge stored in its depletion layer capacitance (Cd). However, when photons (light) are incident on the photodiode 108, a photocurrent, Ip, will flow from the cathode to the anode of the photodiode. The photocurrent (Ip) discharges the photodiode's depletion layer capacitance (Cd) and causes the voltage across the photodiode 108 to drop. The photocurrent (Ip) is integrated on the depletion layer capacitance (Cd) along with the parasitic capacitance (Cp) during a certain integration time (Ti). The total charge that is integrated on the capacitance equals Ip*Ti. When the integration time ends, the output signal voltage (Vs) will have dropped to an amount where Vs=Ip*Ti/(Cd+Cp), in which Cp is substantially equivalent to the parasitic capacitance of the gate of the source follower transistor 104 and the source of the reset transistor 102. After the integration time has passed, a positive pulse is applied to the gate of the row select transistor 106 and the output signal voltage (Vs) is read out through the source follower transistor 104 on the column line at the source of the select transistor 106.

A correlated double sampling circuit is used to reduce the fixed pattern noise that would otherwise be introduced by the source follower transistor 104 inside the pixel cell. The voltage on the column line is one threshold voltage (of the source follower transistor 104) below the voltage on the cathode of the photodiode 108. Pixel cell to pixel cell variations in this threshold voltage can introduce different black levels for each individual pixel cell.

In correlated double sampling, the signal voltage across the photodiode 108 minus the threshold voltage of the source follower is first measured and stored on a capacitor (the first sample). The voltage of the first sample will equal Vr−Vs−Vth in which Vs is the signal voltage defined above, Vr is the voltage on the cathode of the photodiode 108 immediately after the pixel has been reset, and Vth is the threshold voltage of the source follower transistor 104. Subsequently, when the photodiode 108 is reset, the reset voltage across the photodiode minus the same threshold voltage of the source follower is measured again (the second sample). The voltage of the second sample will equal Vr−Vth. The exact signal voltage, Vs is calculated by subtraction of the first sample from the second sample.

When using an n-channel reset transistor in the 3-T pixel cell, the voltage on the gate of a reset transistor needs to be pulled above the supply voltage to reset the photodiode to the supply voltage. A charge pump can be used for this purpose. If a charge pump is used, the maximum potential on the cathode of the photodiode can equal the supply voltage (Vcc). If during the reset the voltage on the gate of the reset transistor is not pulled above the supply voltage, a threshold voltage will be lost across the reset transistor 102.

In this case, the maximum potential on the cathode of the photodiode equals the supply voltage minus a threshold voltage (Vcc−Vth). The minimum voltage on the cathode of the photodiode equals one threshold voltage (Vth) of the source follower transistor 104 and one saturation voltage (Vsat) of a current source that is connected to the column readout line to bias the source follower transistor. If no charge pump is used, the signal swing across the photodiode 108 equals Vcc−2*Vth−Vsat. If a charge pump is used, the swing equals Vcc−Vth−Vsat. A large swing is beneficial because it improves the dynamic range of the pixel cell. The dynamic range can be defined as the ratio between the maximum detectable signal level and the minimum detectable signal level. The maximum detectable signal level depends on the signal swing. The minimum detectable signal level is determined by the noise level of the pixel, which is usually dominated by kT/C reset noise. It is worth noting that the dynamic range relates to the ability of the pixel cell to detect contrast details in both bright and dark regions of the sensed image. For a pixel cell with a relatively low dynamic range, either the dark regions of the sensed image would be underexposed or the bright regions would be overexposed.

Figure 3:
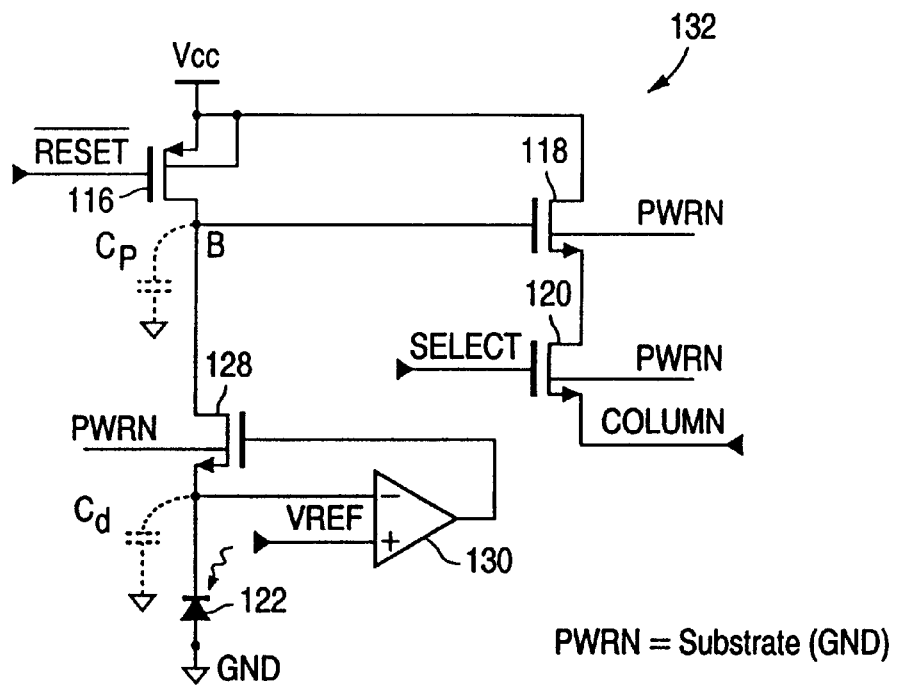
FIG. 3 is a schematic diagram of an exemplary embodiment of another pixel cell architecture having increased sensitivity and reduced operational lag.

In accordance with the present invention, a pixel cell architecture is provided that creates a high performance pixel cell for use in a CMOS image sensor. FIG. 3 illustrates a schematic overview of one embodiment of the high performance pixel cell architecture. In this embodiment, sensitivity gain for a pixel cell is improved over the 3-T pixel cell, shown in FIG. 2, by the addition of a single transfer gate NMOS transistor 128, an opamp 130 with its output coupled to the gate of the transfer gate transistor and a p-channel transistor employed as a reset transistor 116. Typically, p-channel transistors are avoided because they require the presence of an n-well, which can occupy a relatively large area on the substrate, thereby reducing the fill factor of the pixel cell (the fill factor is defined as the ratio between the area of the photodiode and the area of the complete pixel cell). However, because the present embodiment already employs p-channel transistors in the opamp 130, the present invention advantageously uses the p-channel transistor for the reset transistor. One advantage of employing a p-channel transistor to reset the photodiode (or charge conversion capacitor, Cp) is that a charge pump is not needed to reset the pixel to the positive supply voltage. In addition, there is no threshold voltage loss across the reset transistor, which increases the signal swing, thereby improving the dynamic range. This is all accomplished without a further penalty in fill factor.

As shown in FIG. 3, the non-inverting input of the opamp 130 is coupled to a reference voltage Vref, which can be selected to control the opamp's output and the operation of the transfer gate transistor 128. The inverting input of the opamp 130 is coupled to a cathode of a photodiode 122 and the source of the transfer gate transistor 128. The anode of the photodiode 122 and the body of the transfer gate transistor 130 are coupled to ground, i.e., the substrate of the integrated circuit.

The drain of the transfer gate transistor 128 is coupled to the drain of the reset PMOS transistor 116 and the gate of the source follower transistor 118. The gate of the reset transistor 116 is coupled to the reset line and the transistor's body and source are coupled to the positive rail (Vcc). For the source follower transistor 118, the drain is coupled to the positive rail (Vcc), the body is coupled to ground, i.e., the substrate, and the source is coupled to the drain of the select NMOS transistor 120. The gate of the select transistor 120 is coupled to the select line and its body is coupled to ground. Also, the source of the select transistor 120 is coupled to the column line.

A parasitic capacitance (Cp) is substantially created at Node B by the gate of the source follower transistor 118, the drain of the transfer gate transistor 128 and the drain of the reset transistor 116. It is envisioned that the operation of the parasitic capacitance (Cp) at Node B can be implemented with a real capacitor (Cr) that is created at this position in the pixel cell (not shown). Since the value of the parasitic capacitance can vary between sections of a large array of pixel cells, it may be preferable for large arrays to use a real capacitor (Cr) with a known value. However, since the real capacitor (Cr) will typically have a value substantially greater than the parasitic capacitance, the use of the real capacitor can negatively affect the response of the pixel cell.

In this embodiment, the transfer gate transistor 128 and the opamp 130 create a unity gain current buffer in the pixel cell. The loop gain inside the feedback current buffer amplifier is larger and the buffer characteristics are superior to a common gate amplifier implemented with a single transistor. The combination of the transfer gate transistor 128 with the opamp 130 provides a relatively low input impedance at the current buffer. Since the amount of lag is dependent upon the amount of voltage modulation at the cathode of the photodiode 122, reduction in the input impedance at the current buffer will cause a significant reduction in this error signal.

During operation of this embodiment, the gate of the transfer gate transistor 128 is biased at a certain potential, Vtg, which forces the voltage at the cathode of the photodiode 122 to be constant and equal to Vtg−Vth in which Vth is the threshold voltage of the transfer gate transistor. In this embodiment, the photocurrent (Ip) is not integrated on the diode depletion layer capacitance (Cd) because the voltage on the photodiode 122 is forced to a constant potential. Also, since Vtg is not a constant potential, it might seem that because the cathode of the photodiode 122 is biased at Vtg−Vth, the voltage bias on the cathode is not constant. However, in this case, Vth is the gate to source voltage (Vgs) of the transfer gate transistor 128, in which changes to Vgs are precisely compensated by equal and opposite sign changes in Vtg. Changes in Vgs occur because of changes in the photocurrent (Ip) and the relation between the channel current (Ids) and the gate source voltage of a MOS transistor. An important function of the opamp 130 is to control the voltage on the photodiode and make it equal to Vref. The opamp 130 performs this function by changing the voltage on the gate of the transfer gate transistor 128 and adjusting this potential to whatever value the photocurrent (Ip) may have.

The photocurrent (Ip) flows through the transfer gate transistor 128 to the parasitic capacitance (Cp) at Node B which is coupled to the gate of the source follower transistor 118 and optionally to an additional real capacitor (Cr) as discussed above. The photocurrent (Ip) is only integrated on Cp, which means that the output voltage (Vs) is given by: Vs=Ip*Ti/Cp. In the previous pixel cell architecture described above, the output voltage was equal to: Vs=Ip*Ti/(Cd+Cp). However, since Cd is typically large compared to Cp, the output voltage in this embodiment of the pixel cell architecture with the transfer gate transistor 128 is typically much larger than the output voltage of the previously discussed 3-T pixel cell. Thus, by allowing the larger output voltage, the invention creates a high performance pixel cell with increased sensitivity relative to the 3-T pixel cell illustrated in FIG. 2.

Although the high sensitivity created by the transfer gate transistor 128 can cause image lag, the invention employs an amplifier to compensate for any lag. When the photocurrent (Ip) is increased by the higher sensitivity, the transfer gate transistor 128 also needs to conduct a larger current. To conduct this larger current, the gate-source voltage of the transfer gate transistor 128 must be increased. However, without the feedback loop enabled by the opamp 130 as discussed above, the gate of the transfer gate transistor 128 would remain biased at a constant potential. Thus, in order for the transfer gate transistor 128 to conduct a larger current without an opamp as discussed above, the voltage on the source of the transfer gate transistor 128 would have to be decreased. This would result in an error signal on the cathode of the photodiode 122.

Image lag can be related to the input impedance of the transfer gate transistor 128. When the transfer gate transistor is biased at a constant gate potential, it becomes a common gate amplifier and it has a current to current transfer ratio of unity and a low input impedance (for currents flowing into its source) and a high output impedance (for the current flowing out of its drain). This single transistor amplifier stage also acts as a current buffer.

If opamp 130 were not included in the new pixel cell architecture, the lag effect would not be compensated for and the input impedance of the transfer gate transistor 128 would vary under different operating conditions. For example, because the input impedance of the transfer gate transistor 128 is larger than zero, any change in the photocurrent (Ip) would cause changes in the photodiode potential. This means that the changes in the photocurrent (Ip) would modulate the potential on the photodiode 122. If the input impedance of the transfer gate transistor 128 is relatively large, a large voltage modulation will result. The error voltage that occurs on the signal output voltage (Vs) of the pixel cell equals the amplitude of this voltage modulation multiplied by the ratio Cd/Cp. This error voltage occurs on the parasitic capacitance (Cp) and is related to the error voltage on the diode by the ratio of these two capacitances.

The input impedance of the transfer gate transistor 128 equals 1/gm in which gm is the small signal transconductance of the transfer gate transistor 128. Because the transfer gate transistor 128 is operating at very small currents, its transconductance is very small and its input impedance can be quite large and the modulation of the photodiode voltage would also be quite large. Furthermore, because the depletion layer capacitance (Cd) of the photodiode 122 is typically much larger than the parasitic capacitance (Cp), a large error will result in the output signal whenever the photocurrent (Ip) changes. Again, it should be mentioned that this is a transient effect that could occur if the invention did not employ an amplifier to prevent voltage modulation across the photodiode. The lag effects discussed above could cause the pixel cell to have a slow response to changes in the photocurrent (Ip), which would cause an effect on the video signal from the image sensor that is known as lag.

Additionally, if the opamp 130 were not used, whenever the photocurrent changed, the potential on the photodiode 122 would have to also change. A change in the voltage across the photodiode 122 and its depletion layer capacitance (Cd) would require that some photocurrent (Ip) would also have to flow into or out of the photodiode. In this case, at least a portion of the photocurrent (Ip) would be integrated on Cd instead of the parasitic capacitance (Cp). Also, the pixel cell could not detect any portion of the photocurrent (Ip) flowing into Cd and the corresponding portion of the signal would be lost. However, since the invention employs an amplifier, i.e., opamp 130, this negative effect is reduced by orders of magnitude.

As shown in FIG. 3, the voltage on the cathode of the photodiode 122 is forced equal to a reference voltage Vref at the non-inverting input of the opamp 130. The functionality of the opamp 130 may be substantially realized as a common five transistor single stage OTA (operational transconductance amplifier), consisting of an n-channel transistor operating as a current source, an n-channel differential input pair of transistors and two p-channel transistors acting as a current mirror. In this implementation of the amplifier 130, a minimum bias voltage on the photodiode 122 is required that is equal to the threshold voltage (of the n-channel input pair) and one saturation voltage (of the n-channel current source transistor).

Figure 4:
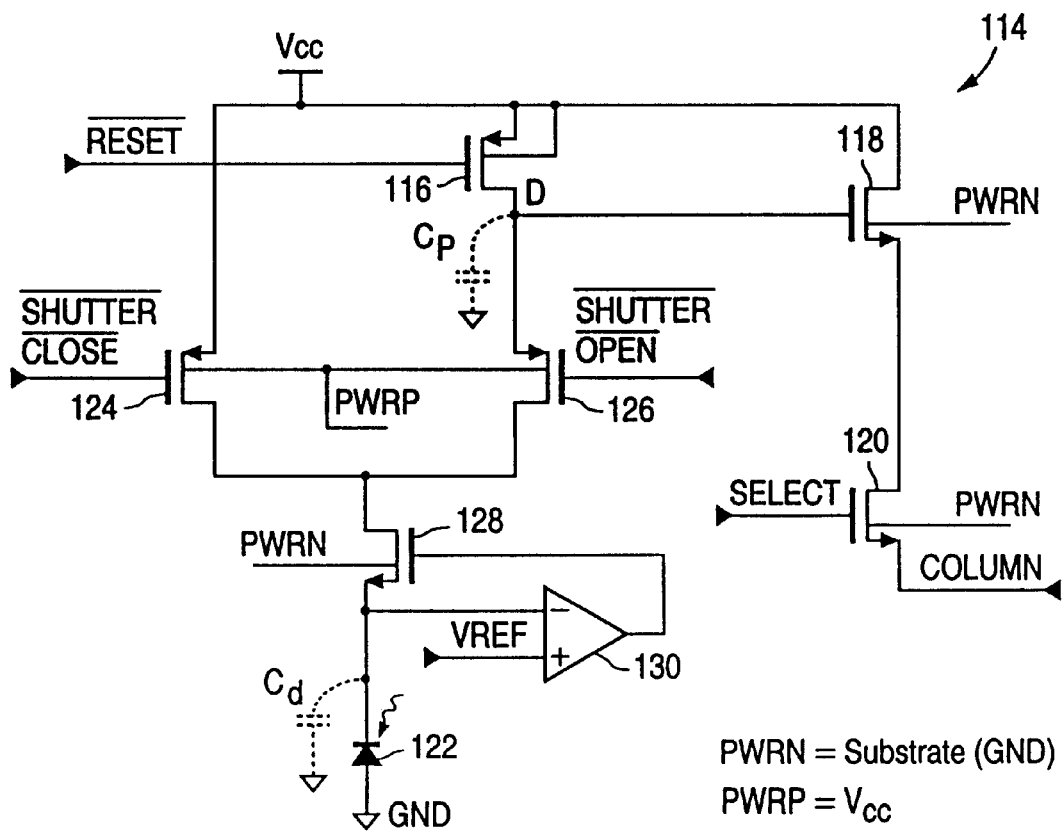
FIG. 4 is a schematic diagram of an exemplary embodiment of another pixel cell architecture having increased sensitivity, reduced operational lag and an electronic shutter to capture images of moving objects.

Another embodiment of a pixel cell architecture illustrated in FIG. 4 shows a current switch (electronic shutter) combined with the high performance pixel cell architecture illustrated in FIG. 3. The embodiment illustrated in FIG. 4 is more desirable than employing a rolling electronic shutter with the 3-T pixel cell illustrated in FIG. 2. For example, when a particular row of pixel cells in the 3-T pixel cell is read out and reset, each of the other rows is integrating. After the readout/reset process of the particular row is finished, this row is left to integrate while each of the other rows is being read out/reset. In this case, the total integration time equals the time that is required to read out all of the rows of the array. One disadvantage of the rolling electronic shutter with the 3-T pixel cell is the resulting distortion of the sensed image when the object is moving due to varying integration periods of the pixels in different rows. The embodiment shown in FIG. 4 provides an electronic shutter for each pixel cell to ensure that the integration periods of all of the pixel cells in an array have the same start and stop times (uniform integration periods). Thus, the image sensor can sense the image of a moving object without distortion.

For this embodiment, the drain of the transfer gate transistor 128 is coupled to the drain of the shutter close PMOS transistor 124 and the drain of the shutter open PMOS transistor 126. The body of the shutter close transistor 124 and the body of shutter open transistor 126 are coupled to each other and these two bodies are also connected at PWRP to the positive rail of the power supply (Vcc). The source of the shutter close transistor 124 is coupled to the positive rail of the source voltage (Vcc) and the shutter close line is coupled to the gate of the transistor 124. The gate of the shutter open transistor 126 is coupled to the shutter open line and the source is coupled at Node D to the gate of the source follower NMOS transistor 118 and the drain of the reset PMOS transistor 116. The gate of the reset transistor 116 is coupled to the reset line and the transistor's body and source are coupled to the positive rail (Vcc). For the source follower transistor 118, the drain is coupled to the positive rail (Vcc), the body is coupled to ground, i.e., the substrate, and the source is coupled to the drain of the select NMOS transistor 120. The gate of the select transistor 120 is coupled to the select line and its body is coupled to ground. Also, the source of the select transistor 120 is coupled to the column line.

The electronic shutter controls the photocurrent (Ip) flowing through the transfer gate transistor 128, which is implemented with the shutter close transistor 124 and the shutter open transistor 126. Depending on whether the electronic shutter is open or closed, the photocurrent (Ip) will flow from the photodiode capacitance, (Cd) as discussed above and below, through the shutter open transistor 126 to the charge integrating on the parasitic capacitor Cp, or through the shutter close transistor 124 to the positive supply rail (Vcc), respectively. The voltage on the parasitic capacitance (Cp) can be read out using the source follower transistor 118 and the (row) select transistor 120 as discussed above and below.

In this embodiment, the operation of the electronic shutter occurs as follows. During a reset operation for sensing an image of an object with a pixel cell, the gate of the reset transistor 116 is pulled high with a pulse to reset the voltage bias on the parasitic capacitor (Cp) at Node D and the shutter open transistor 126 is turned on. The parasitic capacitance (Cp) at node D is charged by the positive supply voltage.

Also, since the amplifier is always active and the photodiode 122 is always biased with the feedback circuit as described above, when the reset pulse is removed and the electronic shutter is opened, the pixel cell will be immediately ready for photocurrent integration on the parasitic capacitance (Cp). Additionally, this reset pulse is applied globally to all pixel cells in the array simultaneously.

After the global reset pulse is removed (from all pixel cells in the array simultaneously), the photocurrent (Ip) is integrated on the parasitic capacitance (Cp), not Cp+Cd because the potential at the cathode of the photodiode 122 is held constant. Once a certain integration time interval (Ti) passes, the shutter open transistor 126 is turned off. This operation is performed simultaneously (globally) on all pixel cells in the array. When the shutter open transistor 126 turns off, the parasitic capacitance (Cp) is no longer coupled to the photodiode and the photocurrent (Ip) can only integrate on Cd. However, the shutter close transistor 124 simultaneously turns on and the potential on the photodiode 122 is held at a constant potential. Otherwise, the voltage on the cathode of the photodiode 122 would keep decreasing at a rate that is determined by the incident light intensity (the photodiode conducts in the presence of light).

Since the shutter open transistor 126 and the reset transistor 116 are off, the voltage on the parasitic capacitance (Cp) remains constant, i.e. the signal voltage at the end of the integration interval is stored on Cp. After the electronic shutter closes, the voltages that have been realized by integrating the photocurrents on (Cp) in the different pixel cells of the array during the integration time (Ti) can be read out, row by row as described above and below.

The readout process takes time, and during this time, the voltage on the photodiode 122 would drop because of the photocurrent (Ip) unless another circuit element intervened, i.e., the shutter close transistor 124 turns on. For example, if the shutter close transistor did not turn on the voltage on the photodiode 122 could drop below zero volts, which would forward bias the photodiode. If the potential across the photodiode 122 dropped below zero, the photodiode would start injecting electrons into the substrate. In a typical image sensor, these injected electrons can be collected by neighboring photodiodes and could cause a deleterious effect in the sensed image known as blooming. Also, the injected electrons could be collected on the drains and sources of NMOS transistors.

Additionally, for large photocurrents during the readout process, the blooming mechanism can bypass the operation of the shutter open transistor 126 and prevent the electronic shutter from working when there are NMOS transistors coupled to the parasitic capacitor (Cp). To prevent the blooming effect from occurring, the shutter close transistor 124 is added to the high performance pixel cell architecture and it is biased in such a way that it will always turn on whenever the shutter open transistor 126 is turned off and before the voltage on the cathode of the photodiode 122 gets close to zero volts. Before the blooming effect can occur, the shutter close transistor 124 creates a current path that prevents any excess photocurrent (Ip) from flowing into the substrate.

Also, the shutter close transistor 124 enables the photodiode 122 to be biased at its constant operational voltage when the electronic shutter is closed. Without the shutter close transistor 124, the potential across the photodiode 122 could have any value (within the rails of the power supply) when the electronic shutter was closed. In this case, the photodiode 122 would not be ready for immediate photocurrent integration whenever the electronic shutter opened. Instead, the potential across the photodiode 122 would have to reach its DC bias state before meaningful values of the photocurrent could be integrated on the parasitic capacitance (Cp). To reach the DC bias state, currents would need to flow in the circuit and if these currents integrated on the parasitic capacitance (Cp), large signal errors would result.

Additionally, when a correlated sampling technique is used with the electronic shutter for readout, two reset pulses are applied for each image that is taken by the image sensor. The first reset pulse is a global reset pulse, which is applied to all pixels in the array simultaneously. The negative edge of this pulse indicates the start of the integration period for all pixel cells in the array. The second reset pulse is applied on a row by row basis, whenever the signal voltages from a row have been sampled, and the reset signal levels are required to calculate the difference between the signal voltage and the reset voltage as described above and below.

Figure 5:
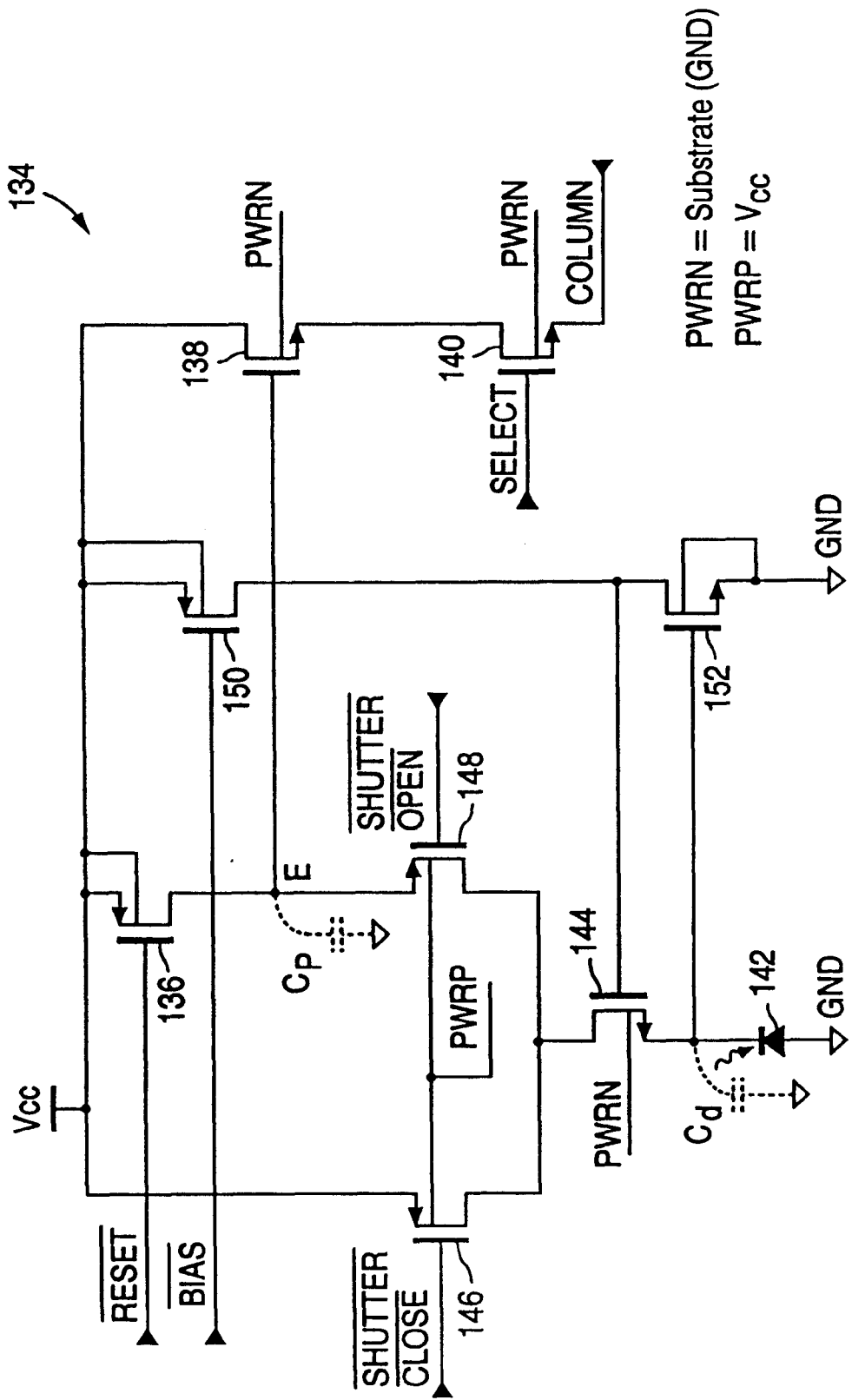
FIG. 5 is a schematic diagram of an exemplary embodiment of an eight-transistor pixel cell architecture having increased sensitivity, a two-transistor amplifier to reduce operational lag and an electronic shutter.

FIG. 5 illustrates a schematic 134 of another embodiment of the high performance pixel cell architecture that is substantially similar to the embodiment shown in FIG. 4 except that the function of the opamp is implemented by two transistors and a smaller minimum bias voltage on the photodiode. An n-channel common source amplifier with an active p-channel load is realized with a bias PMOS transistor 150 and an amplifier NMOS transistor 152. This amplifier implementation automatically fixes the bias voltage on a photodiode 142 to one threshold voltage (of the n-channel common source amplifier). Thus, the bias voltage in this embodiment of the new pixel cell architecture can be slightly smaller than with the OTA amplifier discussed above. This smaller minimum bias voltage on the photodiode increases the maximum signal swing on the integrating capacitor, which improves the dynamic range of the pixel cell.

The gate of a transfer gate NMOS transistor 144 is coupled to the drain of the NMOS transistor 152 and the drain of the bias PMOS transistor 150. The body and the source of the transistor 152 and the anode of a photodiode 142 are coupled to the substrate. The cathode of the photodiode 142 is coupled to the gate of the transistor 152 and the source of the transistor 144. The source and body of the transistor 150 are coupled to the positive rail of the power supply (Vcc) and the gate is coupled to a bias line.

The drain of the transfer gate transistor 144 is coupled to the drain of the shutter close PMOS transistor 146 and the drain of the shutter open PMOS transistor 148. The body of the shutter close transistor 146 and the body of shutter open transistor 148 are coupled to each other and both bodies are coupled to PWRP, i.e., the positive rail of the power supply (Vcc). The source of the shutter close transistor 146 is coupled to the positive rail of the source voltage (Vcc) and the shutter close line is coupled to the gate of the transistor. The gate of the shutter open transistor 148 is coupled to the shutter open line and the source is coupled at Node E to the gate of the source follower NMOS transistor 138 and the drain of the reset PMOS transistor 136. The gate of the reset transistor 136 is coupled to the reset line and the transistor's body and source are coupled to the positive rail (Vcc). For the source follower transistor 138, the drain is coupled to the positive rail (Vcc), the body is coupled to ground, i.e., the substrate, and the source is coupled to the drain of the select NMOS transistor 140. The gate of the select transistor 140 is coupled to the select line and its body is coupled to ground. Also, the source of the select transistor 140 is coupled to the column line.

The operation of the embodiment of the pixel cell shown in FIG. 5 can be described as follows. An active load transistor 150 biases the common source amplifier at a certain supply current. The supply current can be very small because the in-pixel amplifier transistor 152 only drives the very small capacitive load of the transfer gate transistor 144 (typically below a microampere). To conduct the bias current, the amplifier transistor 152 needs to have a certain gate to source voltage. The gate to source voltage of the amplifier transistor 152 equals the bias voltage across the photodiode 142. If the bias on the photodiode 142 is smaller than the gate to source voltage that the amplifier transistor 152 needs to conduct the bias current, the active load transistor 150 will pull up the potential on the output of the in-pixel amplifier (the amplifier consists of the amplifier transistor 152 and the active load transistor 150). Since the amplifier output is connected to the gate of the transfer gate transistor 144, when the gate of the transfer gate is pulled up, the transfer gate transistor will start to conduct more current and the current flowing into the photodiode 142 will increase the voltage across the photodiode. The process continues until an equilibrium is reached where the voltage across the photodiode 142 equals the gate to source voltage of the amplifier transistor 152 that is necessary to conduct the bias current.

Similarly, when the voltage across the photodiode 142 is too large, the amplifier transistor 152 will conduct more current than the bias current, which decreases the potential on the gate of the transfer gate transistor 144. This decrease in potential causes a decrease in the current flowing into the photodiode 142 through the transfer gate transistor 144 and decreases the potential across the photodiode. There is a unity gain voltage feedback from the input of the amplifier (the gate of the amplifier 152) via the output of the amplifier (the drains of the amplifier transistor 152 and the active load transistor 150) to the source of the transfer gate transistor 144 which is connected to the input of the amplifier.

The above description of the operation of this embodiment of the pixel cell architecture holds for any value of the photocurrent (Ip). A change in the photocurrent will result in a change in the voltage at the input of the amplifier. The feedback loop will quickly adjust the bias on the gate of the transfer gate transistor 144 to ensure that the voltage across the photodiode 142 remains constant and the current through the transfer gate transistor 144 remains equal to the photocurrent.

The operation of the electronic shutter in FIG. 5 is as follows. First, a global reset mode is produced. In all pixel cells, the reset transistor 136 is conducting, pulling the voltage on the charge integration capacitor, i.e., the parasitic capacitance (Cp) at Node E, to the supply voltage. In the global reset mode, the shutter close transistor 146 is conducting and the shutter open transistor 148 is off. All photocurrent (Ip) is flowing through the transfer gate transistor 144 and the shutter close transistor 146 into the power supply. At the start of the integration interval (Ti), the global reset is dropped, i.e., the reset transistor 136 is turned off. At substantially the same time, the shutter close transistor 146 is switched off and the shutter open transistor 148 is switched on. From this moment on, the photocurrent (Ip) flows through the shutter open transistor 148 and discharges the charge integration capacitor (Cp). When the integration time is over, the shutter open transistor 148 is switched off and the shutter close transistor 146 is switched on. From this moment on, the voltage across the parasitic capacitance (Cp) is constant and later the signal voltage that has been realized on this capacitor during the integration of the photocurrent (Ip) can be read out using the conventional readout process discussed above.

Figure 6:
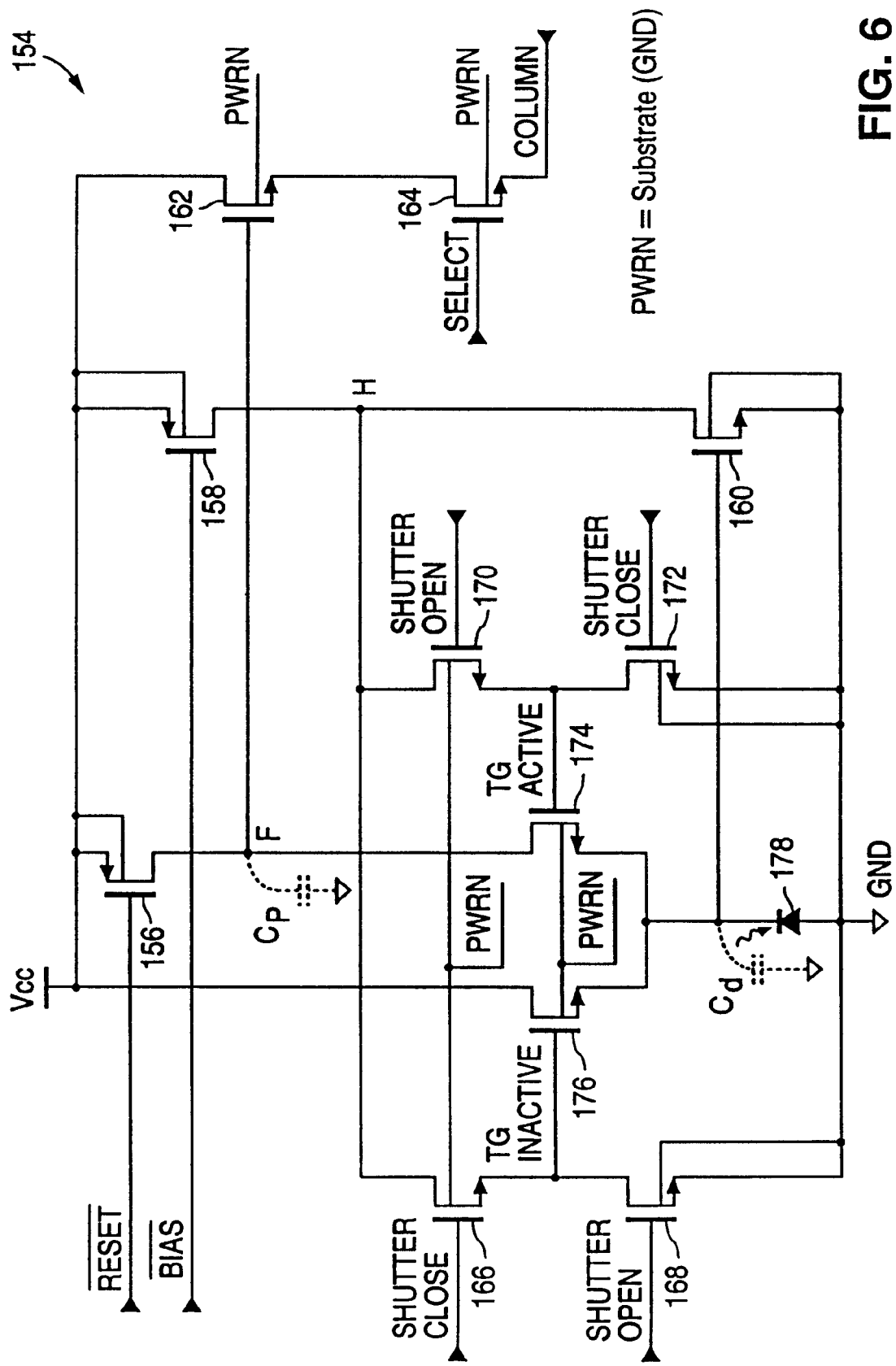
FIG. 6 is a schematic diagram of an exemplary embodiment of an eleven transistor pixel cell architecture with two transfer gate transistors to increase sensitivity, a two transistor amplifier to reduce operational lag and separate electronic shutters for each transfer gate transistor.

A schematic diagram 154 in FIG. 6 illustrates another embodiment of the present invention that is substantially similar to the embodiment shown in FIG. 5 with a couple of exceptions. For example, this embodiment alternately employs a TGactive NMOS transistor 174 and a TGinactive NMOS transistor 176 to conduct a photocurrent (Ip) from a photodiode 178 when the electronic shutter is disposed in either an open (active) or closed (inactive) state.

The gate of a reset PMOS transistor 156 is coupled to a reset line and the gate of the bias PMOS transistor 158 is coupled to a bias line. The sources and bodies of the transistors 156 and 158 are coupled to the positive rail of the power supply (Vcc). The drain of the reset transistor 156 is coupled at Node F to the gate of a source follower NMOS transistor 162, the drain of the TGactive transistor 174 and the parasitic capacitance (Cp). The drain of the source follower transistor 162 is coupled to the positive rail voltage (Vcc) and the source is coupled to the drain of a select NMOS transistor 164. The gate of the transistor 164 is coupled to a select line, the source is coupled to a column line and the body is coupled to the substrate at PWRN.

A drain of the bias transistor 158 is coupled at Node H to the drain of an amplifier NMOS transistor 160, the drain of a shutter close NMOS transistor 166 and the drain of a shutter open NMOS transistor 170. The body and the source of the amplifier transistor 160 are coupled to the substrate (ground); and the amplifier transistor's gate is coupled to the cathode of the photodiode 178, the source of the TGactive transistor 174 and the source of the TGinactive transistor 176. The body of the transistor 174 is coupled to the body of the transistor 176 and both bodies are coupled to the PWRN, i.e., the substrate. Also, the drain of the transistor 176 is coupled to the positive rail of the power supply (Vcc).

The source of the shutter open transistor 170 is coupled to the drain of the deactivate NMOS transistor 172 and the gate of the TGactive transistor 174; and the body of the shutter open transistor 170 is coupled to the body of the shutter close transistor 166 and both bodies are coupled to PWRN (substrate). The gate of the transistor 172 is coupled to the shutter close line. The body and the source of transistor 172 are coupled to the substrate. The gate of the shutter close transistor 166 is coupled to the shutter close line. The gate of the NMOS transistor 168 is coupled to the shutter open line. The body and source of the transistor 168 are coupled to the substrate. The source of the transistor 166 and the drain of the transistor 168 are coupled to the gate of transistor 176.

The operation of the electronic shutter for the embodiment shown in FIG. 6 is similar in ways to the electronic shutter illustrated in FIG. 5, albeit different in other ways as follows. When the electronic shutter is opened (shutter open line causes transistor 170 to conduct), the output of the amplifier at node H is connected to the gate of the TGactive transistor 174 and the photocurrent is integrated on the charge integration capacitor, i.e., the parasitic capacitor (Cp) occurring at Node F. Additionally, when the electronic shutter is closed, the output of the amplifier is connected to the gate of TGinactive transistor 176 (shutter close line causes transistor 166 to conduct), and the photocurrent (Ip) flows to the positive rail of the supply voltage.

This embodiment provides for forcing the gates of the transistors 174 and 176 to ground whenever these two transfer gate transistors need to be completely deactivated. For deactivation, transistors 166 and 170 are turned off, transistors 168 and 172 are turned on, and the gates of the transistors 176 and 174 are pulled down to the ground potential.

The operation of the in-pixel amplifier in FIG. 6 is substantially similar to the operation of the amplifier in FIG. 5. Also, in FIG. 6, the voltage swing on the gates of the transfer gate transistors is smaller than on the gates of the shutter close and shutter open transistors 146 and 148 in FIG. 5 which results in less charge injection into the charge storage Node F. Also, in the implementation of FIG. 6, the parasitic capacitance (Cp) does not include a gate to channel capacitance of a current switch transistor, which increases the sensitivity of the pixel cell.

Additionally, because p-channel transistors are required for the realization of the amplifiers in FIGS. 5 and 6, an n-well would have to be created inside the pixel cell. Usually, p-channel transistors are avoided because the n-well occupies a large area, which reduces the fill factor of the pixel (ratio of sensitive pixel area to total pixel area). Since the use of p-channel transistors is advantageous in this embodiment of the new pixel cell architecture, this invention is particularly useful in image sensors that can employ a relatively large sized pixel cell.

Furthermore, since an n-well is already present inside this embodiment of the pixel cell for the p-channel transistors that are used in the in-pixel amplifier, p-channel transistors can also be used for the reset transistor without a further penalty in fill factor. This is advantageous because when a p-channel transistor is used to reset the photodiode or charge storage capacitor (Cp) the pixel can be reset to the positive supply voltage without the use of a charge pump. Therefore, no threshold voltage will be lost across the reset transistor, which increases the signal swing inside the pixel, thereby improving the dynamic range of the pixel cell.

When a PMOS reset transistor is used in a pixel cell, there can be some positive charge injection when the reset pulse is removed from the gate of the reset transistor. It is envisioned that this injection will result in a voltage larger than the supply voltage on the charge integration node at the drain of the PMOS reset transistor, which can turn on the parasitic drain to n-well diode that is formed between the drain of the reset transistor and the n-well in which this transistor is implemented. The voltage on the charge integration node would drop because of the current flowing through this diode. However, if this discharging process were not very repeatable, it may cause noise. To prevent this possible noise, the charge injection that occurs in the reset transistor can be cancelled by bringing another line across the surface of the image sensor that carries the inverted reset signal. When this line is capacitively coupled to the charge integration node, the positive charge injection in the reset transistor will be cancelled, thereby preventing this potentially deleterious effect.

Figure 7:
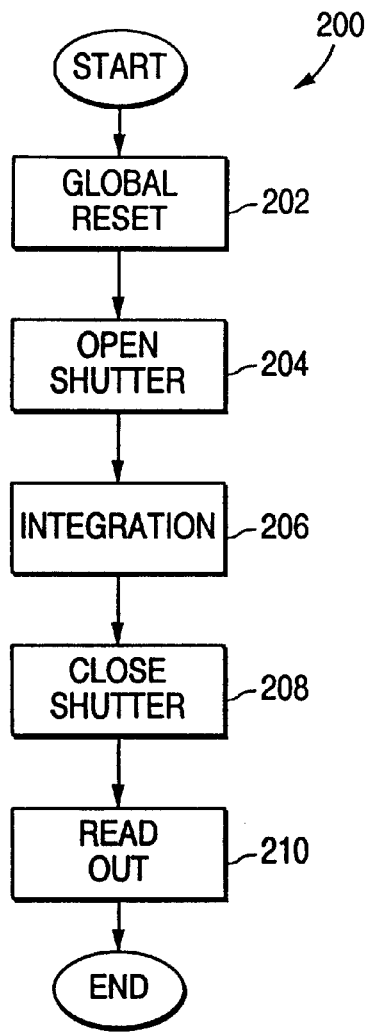
FIG. 7 is a flow chart for the operational flow to implement an exemplary embodiment of the invention with high sensitivity, low lag and an electronic shutter for pixel cells in an image sensor.

FIG. 7 is a flow chart illustrating an, overview 200 of the operational flow to implement one embodiment of the invention. The operational flow moves from a start module to a module 202 where a global reset function is performed on each pixel cell in an array for an image sensor. Moving to a module 204, the electronic shutter is opened. Advancing to a module 206, the photocurrent is integrated on the parasitic capacitance (Cp). At the module 208, the electronic shutter is closed. Flowing to a module 210, each pixel cell in the image sensor is read out. Next, the operational flow moves to an end module and resumes performing other actions.

Figure 8:
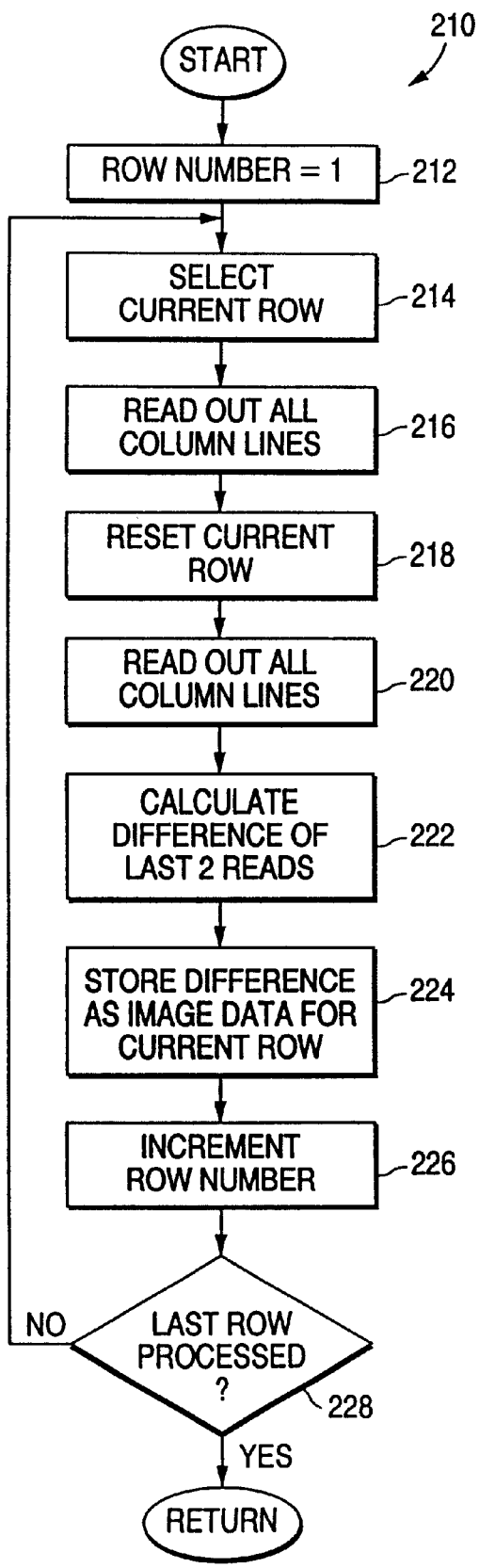
FIG. 8 is a flow chart for the operational flow to readout the values at each column of each row of the pixel cells in the image sensor.

FIG. 8 is a flow chart showing greater detail of the actions performed in module 210, as shown in FIG. 7 and discussed above. The operational flow moves from a start module to a module 212 where the row number of the pixel cells to be read out is set to the first row in the array. Flowing to a module 214, the current row of pixel cells is selected. Moving to a module 216, for the current row, all of the pixel cell values on all of the column lines are read out. Advancing to a module 218, each pixel cell value in the current row is reset. At the module 220, for the current row, all of the pixel cell values on all of the column lines are read out again. Stepping to a module 222, a difference between the last two read outs for each value for each pixel cell in the current row are calculated. Moving to a module 224, the calculated differences are stored as image data for the current row. At the module 226, the current row number is incremented. Advancing to a decision module 228, a determination is made whether the last row has been processed. If no, the operational flow jumps to module 214 and performs substantially the same actions discussed above. However, when the determination at the decision module 228 is yes, the operational flow moves to a return module and resumes other actions.

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

I claim:

1. An image sensing pixel cell used in a pixel cell array, comprising:
    (a) a reset circuit that couples an initial voltage to a first node at an initial time;
    (b) a capacitance substantially associated with the first node that stores the initial voltage at the initial time;
    (c) a photodiode;
    (d) a unity gain current buffer arranged to bias the photodiode at a relatively constant voltage, the unity gain current buffer comprising a transfer gate transistor and an amplifier circuit, the amplifier circuit being employed to adjust a gate voltage on the transfer gate transistor in a manner to maintain the relatively constant voltage on the photodiode, the gate voltage being adjusted based on a photocurrent flowing in the photodiode; and
    (e) a voltage buffer circuit that buffers the first node to produce a second voltage, the second voltage corresponds to the voltage at the first node at a subsequent time, the voltage at the first node at the subsequent time is different from the initial voltage when the photocurrent flows in the photodiode.

2. The image sensing pixel cell as in claim 1, wherein the reset circuit includes a PMOS transistor.

3. The image sensing pixel cell as in claim 1, wherein the voltage buffer circuit is a source follower circuit.

4. The image sensing pixel cell as in claim 1, wherein the voltage buffer circuit is a source follower circuit, and the capacitance associated with the first node is dominated by a capacitance of the source follower.

5. The image sensing pixel cell as in claim 1, further including a select circuit that selectively couples the second voltage to a column output of the pixel cell when selected.

6. The image sensing pixel cell as in claim 5, wherein the select circuit is a MOS transistor.

7. The image sensing pixel cell as in claim 1, wherein the amplifier circuit includes an operational amplifier, the operational amplifier having an inverting input coupled to the photodiode, a non-inverting input coupled to a reference voltage, and an output arranged to bias the photodiode at the reference voltage.

8. The image sensing pixel cell as in claim 7, wherein the transfer gate transistor includes a MOS transistor, a gate of the MOS transistor is coupled to the output of the operational amplifier, and the MOS transistor conducts a current corresponding to the photocurrent.

9. The image sensing pixel cell as in claim 1, further comprising a shutter circuit, the shutter circuit is configured to provide a first conductive path for the photocurrent between the photodiode and a power supply connection when in a closed position, and the shutter circuit is also configured to provide a second conductive path for the photocurrent between the photodiode and the first node when in an open position.

10. The image sensing pixel cell as in claim 9, wherein the shutter circuit includes a first and second MOS transistor sharing a common drain connection, the photodiode is coupled to the common drain connection, the first transistor is arranged to provide the first conductive path and the second transistor is arranged to provide the second conductive path.

11. The image sensing pixel cell as in claim 9, wherein the shutter circuit includes a first and second MOS transistor sharing a common source connection, the photodiode is coupled to the common source connection, the first transistor is arranged to provide the first conductive path and the second transistor is arranged to provide the second conductive path.

12. The image sensing pixel cell as in claim 1, further comprising a shutter circuit, the shutter circuit including a first and second MOS transistor sharing a common source connection, the common source connection is coupled to the photodiode, the first transistor is arranged to selectively couple the photocurrent to a power supply connection and the second transistor is arranged to selectively couple the photocurrent to the first node, each of the first and second MOS transistor having a shutter control coupled to a respective gate, and each shutter control is arranged to prevent charge from being injected into the first node.

13. The image sensing pixel cell as in claim 12, wherein each shutter control includes a first and second switching transistor, the first switching transistor coupling the output of the amplifier circuit to the respective gate, the second switching transistor coupling the respective gate to a circuit ground, the first and second switching transistors are active at different times whereby the first and second switching transistors prevent charge from being injected into the first node.

14. The image sensing pixel cell as in claim 1, wherein the amplifier circuit includes an n-channel common source amplifier with an active p-channel load.

15. The image sensing pixel cell of claim 1, wherein the amplifier circuit comprises a common five transistor single stage operational transconductance amplifier.

16. The image sensing pixel cell of claim 1, wherein the transfer gate transistor includes an active transfer gate transistor and an inactive transfer gate transistor.

17. The image sensing pixel cell of claim 16, wherein the amplifier circuit adjusts the gate voltage of the active transfer gate transistor and the inactive transfer gate transistor through a first and second switching transistor, the first switching transistor providing a first conductive path to the active transfer gate transistor and the second switching transistor providing a second conductive path to the inactive transfer gate transistor.

18. An image sensing pixel cell circuit comprising:

(a) a reset means for compiling an initial voltage to a storage node at an initial time;

(b) a storage means for storing the initial voltage at the storage node;

(c) an image sensing means for producing a current in response to sensing a portion of an image associated with the pixel cell such that when the current flows in the sensing means, a subsequent voltage at the storage node is produced that is different from the initial voltage;

(d) a bias means for maintaining a relatively constant bias voltage across the image sensing means, the bias means comprising a transfer gate transistor and an amplifier means, wherein the amplifier means adjusts a gate voltage on the transfer gate transistor based on the current flowing in the sensing means in a manner to maintain the relatively constant voltage on the photodiode; and (e) a buffer means for buffering the storage node to produce an output voltage at an output node such that the output voltage corresponds to the portion of the image sensed by the image sensing means.

19. The image sensing pixel cell circuit as in claim 18, wherein the reset means includes a PMOS transistor, and the initial voltage is a power supply voltage.

20. The image sensing pixel cell circuit as in claim 18, wherein the buffer means is a source follower circuit and the storage means includes a capacitance associated with the source follower circuit.

21. The image sensing pixel cell circuit as in claim 18, wherein the bias means includes an operational amplifier, the operational amplifier having an inverting input coupled to the image sensing means, a non-inverting input coupled to a reference voltage, and an output arranged to bias the image sensing means at the reference voltage.

22. The image sensing pixel cell circuit as in claim 18, further comprising a shutter means having an open position and a closed position, the shutter means providing a conductive path for the photocurrent between the image sensing means and a power supply connection when in a closed position, and the shutter means providing another conductive path for the photocurrent between the image sensing means and the storage node when in the open position.

23. The image sensing pixel cell circuit as in claim 22, further comprising a means for preventing charge injection, the means for preventing charge injection prevents charge from being injected into the storage node from the shutter means.

24. The image sensing pixel cell of claim 18, wherein the amplifier means comprises an operational transconductance amplifier.

25. The image sensing pixel cell of claim 18, wherein the amplifier means comprises an n-channel common source amplifier with an active p-channel load.

26. The image sensing pixel cell of claim 18, wherein the transfer gate transistor includes an active transfer gate transistor and an inactive transfer gate transistor.

27. The image sensing pixel cell of claim 26, wherein the amplifier circuit adjusts the gate voltage of the active transfer gate transistor and the inactive transfer gate transistor through a first and second switching transistor, the first switching transistor providing a first conductive path to the active transfer gate transistor and the second switching transistor providing a second conductive path to the inactive transfer gate transistor.

* * * * *

UNITED STATES PATENT AND TRADEMARK OFFICE
CERTIFICATE OF CORRECTION

PATENT NO. : 6,635,857 B1
DATED : October 21, 2003
INVENTOR(S) : Willem J. Kindt It is certified that error appears in the above-identified patent and that said Letters Patent is hereby corrected as shown below:

Column 1,
Line 42, delete "lag free" and insert -- lag-free --.

Column 2,
Line 1, delete "PC" and insert -- P.C. --.
Line 4, delete "the" and insert -- a --.
Line 35, delete "Further" and insert -- further --.

Column 3,
Line 2, after "amplifier" insert -- means, wherein the amplifier means --.

Column 5,
Line 53, after "reset" (first occurrence) insert -- , --.

Column 14,
Line 28, after "(Cp)" insert -- , --.
Line 52, after "an" delete ",".

Column 18,
Line 2, delete "bias" and insert -- amplifier --.

Signed and Sealed this

Twenty-fifth Day of January, 2005

JON W. DUDAS
*Director of the United States Patent and Trademark Office*